United States Patent

Green et al.

[15] 3,659,087

[45] Apr. 25, 1972

[54] CONTROLLABLE DIGITAL PULSE GENERATOR AND A TEST SYSTEM INCORPORATING THE PULSE GENERATOR

[72] Inventors: Richard F. Green, Upper Terrace; Eugene J. Scray, Jr., Burlington; Donald L. Wilder, Colchester, all of Vt.

[73] Assignee: International Business Machines Corporation, Armonk, N.Y.

[22] Filed: Sept. 30, 1970

[21] Appl. No.: 76,892

[52] U.S. Cl. ............................... 235/151.3, 324/73, 328/62, 328/14
[51] Int. Cl. ..................................... G06f 15/20, H03k 3/64
[58] Field of Search ............... 235/151.3; 307/208, 260, 265, 307/268, 223, 293, 269, 267; 328/62, 63, 59, 14, 55, 61, 72, 157; 324/73

[56] References Cited

UNITED STATES PATENTS

| | | | |
|---|---|---|---|
| 3,246,240 | 4/1966 | Arnold et al. | 324/73 |
| 3,546,582 | 12/1970 | Barnard et al. | 324/73 |
| 3,551,822 | 12/1970 | McNelis | 307/208 X |
| 3,320,539 | 5/1967 | Rodner | 328/62 |
| 3,541,441 | 11/1970 | Hrustich | 324/73 |
| 3,543,295 | 11/1970 | Overstreet | 307/208 X |
| 3,500,213 | 3/1970 | Ameau | 328/14 |
| 3,369,220 | 2/1968 | Buyer et al. | 328/55 X |

*Primary Examiner*—Malcolm A. Morrison
*Assistant Examiner*—Edward J. Wise
*Attorney*—Hanifin and Jancin

[57] ABSTRACT

A digital pulse generator provides pulses of arbitrary width. The width of the pulses may be much less than the length of a clock cycle. Once the pulse generator has been adjusted it can produce many pulse patterns without further adjustment. A test system which provides extremely accurate information about a device under test incorporates the pulse generator as its primary element.

8 Claims, 6 Drawing Figures

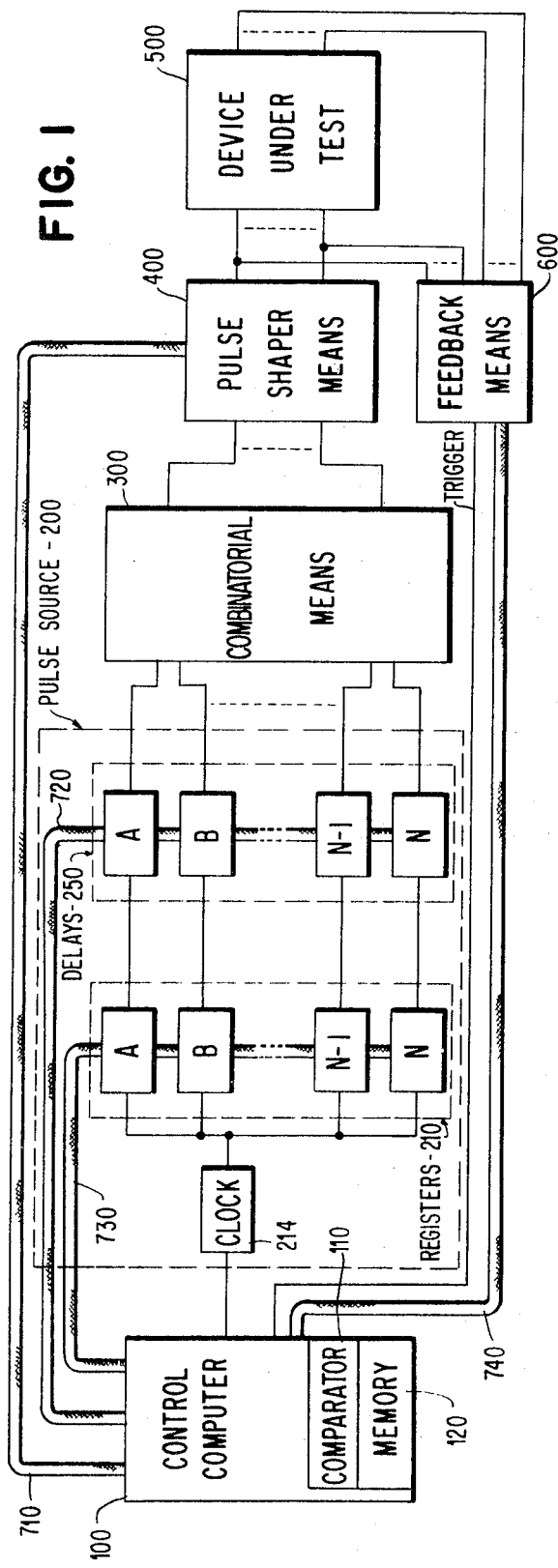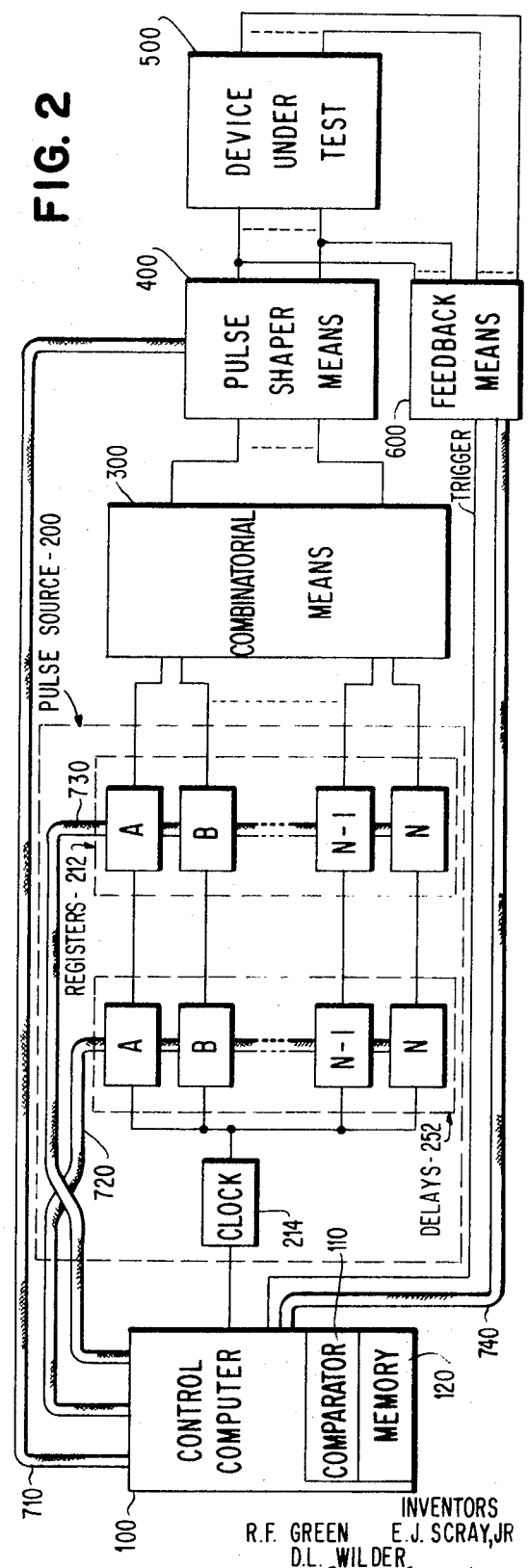

DELAY MEANS

COMBINATORIAL MEANS 3,659,087

CONTROLLABLE DIGITAL PULSE GENERATOR AND A TEST SYSTEM INCORPORATING THE PULSE GENERATOR

RELATED APPLICATION

U.S. application Ser. No. 76,914 filed 9/30/70 by E. J. Scray, Jr. and D. L. Wilder, entitled "A Time Coherent Sampling System for Eliminating the Effects of Test System Jitter and Providing a Simplified Single Transient Threshold Test," which is co-filed with this application is a related application, in that it discloses a preferred feedback system.

BACKGROUND OF THE INVENTION

1. Field of the Invention

The invention relates to the field of controll-able pulse generators, and more particularly to the field of pulse generators for use in automated test systems.

2. Prior Art

It is known in the prior art to obtain a digital pulse stream by passing a single pulse through a tapped delay line. The pulses appearing at the various taps on the delay line are added to produce the desired pulse stream. These systems allow the production of arbitrary pulse streams. However, the versatility of these pulse generators in limited by the restriction to streams of constant width pulses. The limitation of constant width pulses is particularly restricting in a test environment, where one of the things which needs to be tested is the effect of varying pulse widths on devices under test, particularly where the device under test are logic devices.

Test systems, which provide a different pulse generator for each lead of a device under test in order to subject each lead to a different stimulus, are also known in the prior art. These pulse generators must be set up before the start of a test run and are restricted to producing strings of constant width pulses or to producing the same arbitrary pulse stimulus throughout the test run. This limitation to strings of constant width pulses or one arbitrary stimulus for a test run severely restricts the usefulness of these pulse generator systems on multiple lead devices, such as integrated circuits, because a multitude of varying pulse patterns must be provided to adequately test a multiple lead device. These pulse generator systems generally require hand set up of the system by a technician. This hand set up can restrict the accuracy of the set up and consumes a large amount of time.

Known prior art test systems provide pulse generators for stimulating a device under test and separate equipment for abstracting information from data signals produced by the device under test in response to the pulse stimulation. These systems require significant communication between a control system and the pulse generator and information abstraction equipment.

OBJECTS

A primary object of the present invention is to produce arbitrary streams of various width pulses, including arbitrarily narrow pulses.

Another object of the invention is to obtain a wide variety of pulse patterns, from a pulse generator without readjusting the pulse generator.

A further object of the present invention is to produce output pulse characteristics arbitrarily close to desired characteristics by automatic adjustment of a pulse generator while automatically monitoring the characteristics of the generator's output.

A still further object of the invention is to use a pulse generator both to stimulate and to abstract test information from a device under test and to perform preliminary analysis of the information.

SUMMARY

The above objects are accomplished by providing a pulse generator whose output is a train of pulses which is a combination of intermediate pulse streams within the pulse generator. Delay means are provided for delaying the intermediate pulse patterns with respect to each other to obtain desired output pulse widths. Other characteristics of the output pulses are controlled by passing the pulses through a pulse shaper. The pulse generator has a control means for controlling each of the elements which determins characteristics of the output signals, in order to provide output pulse trains with predetermined desired output characteristics. A feedback means is provided for obtaining information about the actual output characteristic. The information about the actual output characteristics is compared with desired characteristics in the control means. The delay means and the pulse shaper are adjusted to modify the actual output characteristics to be the same as the desired characteristics.

In a test system incorporating the pulse generator; the feedback means is additionally connected to a device under test to extract test information from signals produced by the device under test in response to stimulation by the pulse generator.

The above and other objects and advantages of the invention will be apparent from the following, more particular description of the preferred embodiments of the invention, as illustrated in the accompanying drawings.

BRIEF DESCRIPTION OF THE DRAWINGS

FIG. 1 is a block diagram of the preferred embodiment of the invention.

FIG. 2 is a block diagram of an alternate embodiment of the invention.

DETAILED DESCRIPTION

Figure 3:
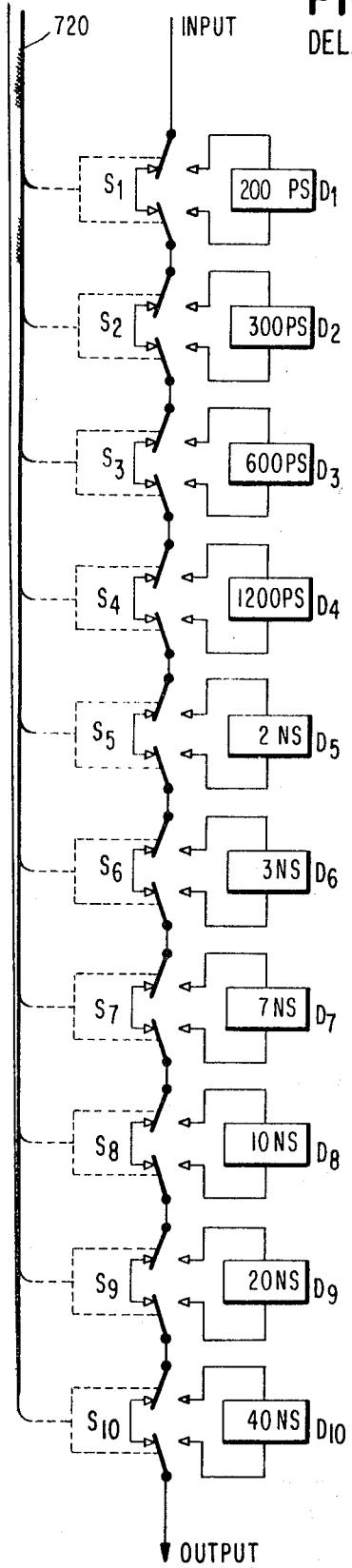
FIG. 3 is a diagram of a controllable delay means used in the preferred embodiment of the invention.

Referring to the block diagram of FIG. 1, it is seen that the pulse generator is comprised of five major blocks. These blocks are control computer 100 for controlling and supervising the operation of the pulse generator, pulse source 200 for providing a plurality of predetermined pulse trains, combinatorial means 300 for combining the plurality of pulse trains from pulse source 200 into a plurality of resultant waveforms; pulse shaper means 400 for setting the characteristics of the resultant pulses and feedback means 600 for obtaining information about the characteristics of the output pulses. Device under test 500 is stimulated by the output pulses of the signal generator and the response of device under test 500 is monitored by the feedback means. Control computer 100 contains a memory 120 for storing desired output pulse characteristics, and a comparator 110 for comparing the desired output characteristics with the actual output characteristics which are determined in a manner to be described hereinafter. The computer is connected by cables to other blocks of the pulse generator so as to control the characteristics of the output pulses as will be explained hereafter.

Pulse source 200 is preferably comprised of a set of binary registers 210A...210N and a set of associated delays 250A...250N. Each of the registers 210 is connected for serial readout in response to a clock signal from clock 214. The registers 210 provide trains of binary pulses when readout serially. The registers are preferably registers in a memory designed for simultaneous serial readout of its register in response to a single clock signal. Nondestructive readout registers are preferred in order to maximize the pulse train repetition rate of the generator.

The controllable delay 250A is connected to the output of register 210A so as to delay the pulse train produced by register 210A by a controllable amount. Each of the other delays 250 is connected to the output of the register 210 having the same letter designation. Thus, each output pulse train may be delayed by a controllable amount.

The preferred form of each of the delay means 250 is diagrammed in FIG. 3. The delay means comprises ten individual delay elements D1–D10 each of whose delay is predetermined from delay resolutions desired. It is recognized that more or fewer delays may be employed. For a delay resolution of 200 picoseconds (ps) in a range between 0 nanoseconds (ns) and 80 ns, the preferred delay values are 200 ps, 300 ps, 600 ps, 1,200 ps, 2 ns, 3 ns, 7 ns, 10 ns, 20 ns, and 40 ns. The total delay of a given delay means 250 is determined by the setting of the computer controlled switches S1 through S10 of that delay means. Each of the switches determines whether the corresponding delay D1 through D10 is included in the path of the pulse stream produced by the corresponding register. In the normal positions of the switches S1–S10 none of the delays D1–D10 is included in the pulse path. There are a number of ways of obtaining each delay, a 12 ns delay is used as an example.

The 2 ns delay D5 and the 10 ns delay D8 may be included in the pulse path by switching S5 and S8. Alternatively 2 ns delay D5, 3 ns delay D6 and 7 ns delay D7 may be put in the pulse path by switching S5, S6, and S7.

A number of ways of obtaining a desired delay are provided because 10 percent tolerance delay lines are used, in order to reduce the cost of obtaining the delay lines. If the desired delay is not provided by one combination of delays, another may be used. If the delay obtained is too small, then small units of delay are inserted into the pulse path to increase the delay to the desired value. If the delay is too large, the shortest delay time delay is taken out of the pulse path and shorter delays are inserted until the desired delay is obtained.

The insertion of delays into and the removal of delays from the pulse path is controlled by computer 100 through cable 720 and the computer actuated switches S1–S10.

Figure 4:
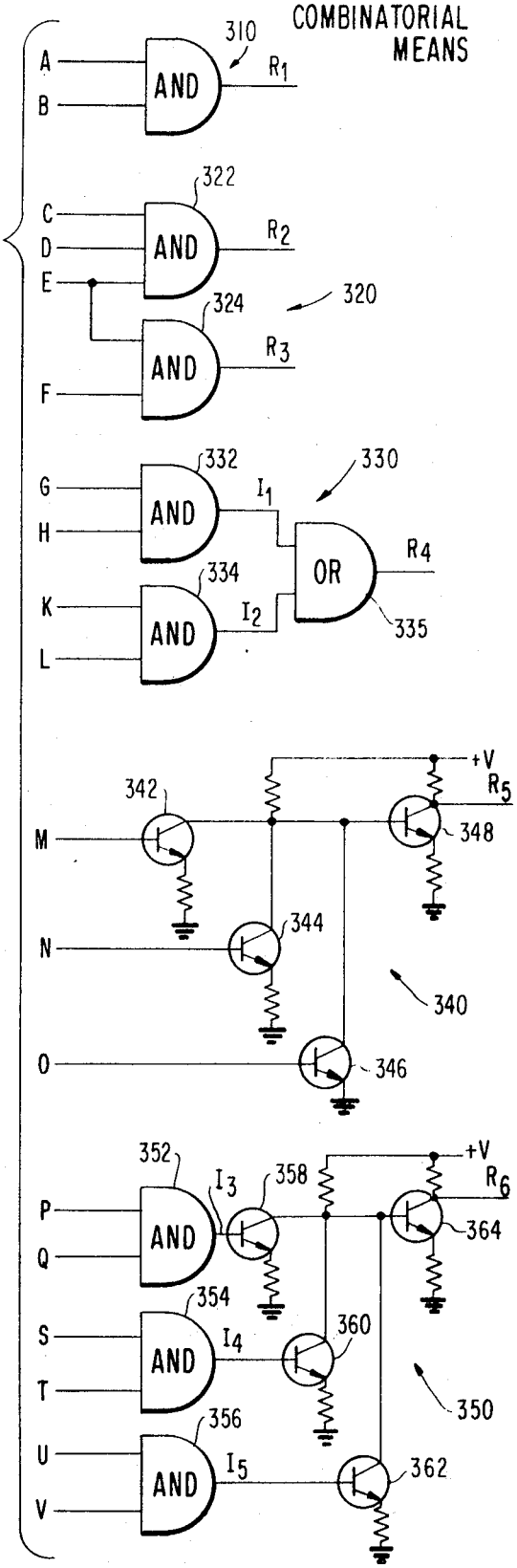
FIG. 4 is a diagram of a number of combinatorial means which may be used in the preferred embodiment of the invention.
Figure 5:
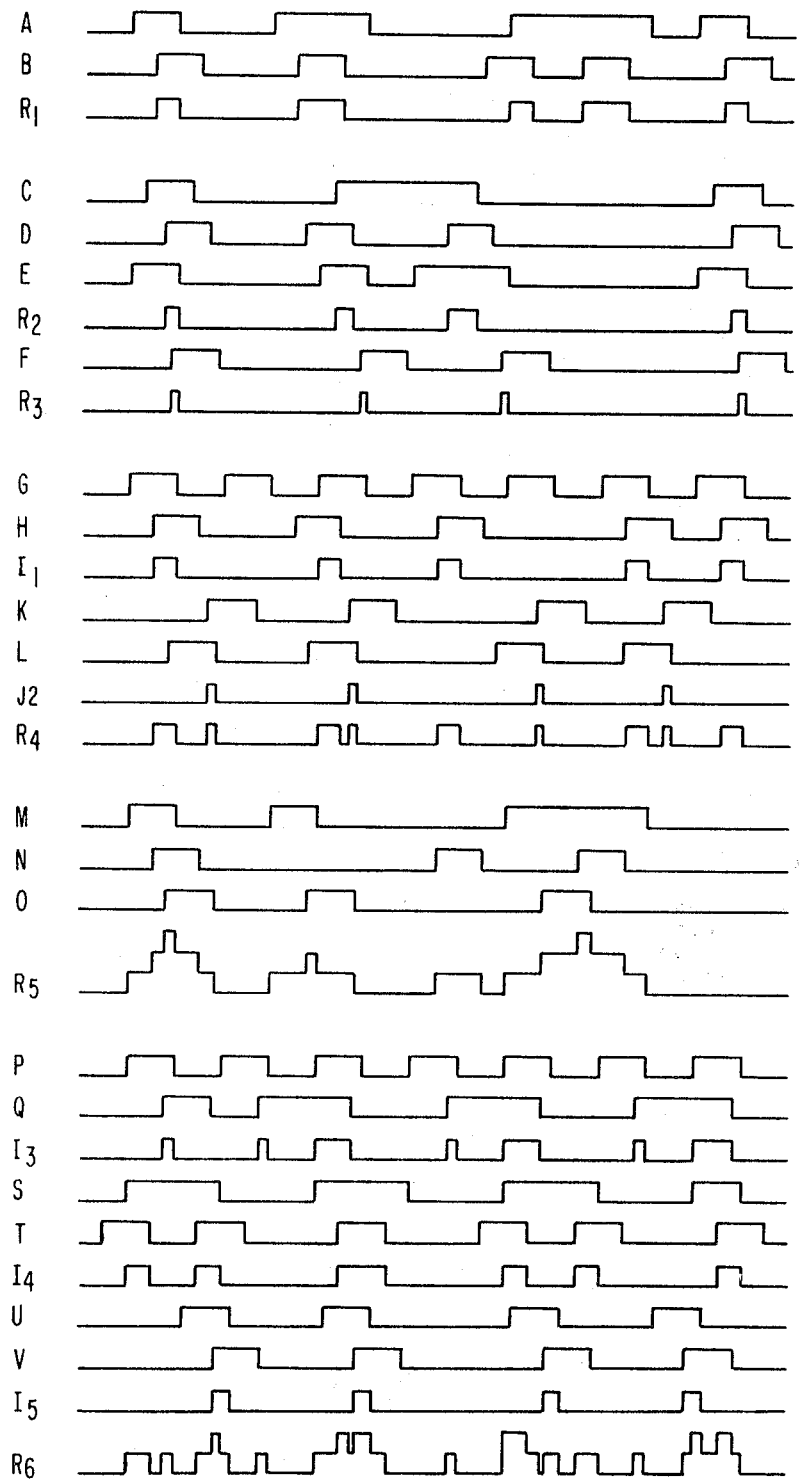
FIG. 5 is a plot of representative pulse patterns produced by the various combinatorial means shown in FIG. 4.

Returning to FIG. 1, the pulse-source-output-pulse trains at the output of the delay means 250 form the inputs to the combinatorial means 300. The combinatorial means 300 combines various pulse streams to produce different output pulse streams. Some representative combinatorial means are shown in FIG. 4 and representative waveforms for each of the combinatorial means are shown in FIG. 5, where a true value is shown as an up level and a false value is shown as a down level for boolean combinatorial means.

Combinatorial means 310 is a two input AND gate having inputs A and B and output R1. As can be seen from FIG. 5, the output R1 has a true value if and only if both A and B have true values. It can be readily seen that the pulse width of the resultant train R1 can be significantly less than the minimum pulse width of the inputs at A and B.

Combinatorial means 320 is a three input AND gate 322 and a two input AND gate 324. The input E is common to both AND gates, each of which operates in a manner similar to that of gate 310.

Combinatorial means 330 is a two stage combinatorial system and is comprised of two first-stage AND gates whose outputs are combined in a second stage OR gate to form the resultant system. This system has a significantly increased versatility over that of simple AND gates such as the AND gates in combinatorial means 310 and 320. Combinatorial means 330 can produce two different pulse widths, both of which are less than the minimum pulse width at the inputs to the first stage AND gates.

Whereas each of the preceding combinatorial means has produced a resultant waveform which is a boolean function of the input waveform; combinatorial means 340 produces a resultant waveform which is an algebraic combination of the input waveforms. As can be seen from FIG. 5, the level of the resultant waveforms depends on how many of the inputs waveforms have true values.

Combinatorial means 350 combines a boolean first stage with an algebraic second stage to provide outputs having a combination of the characteristics produced by the boolean combinatorial means 310, 320, and 330 and the algebraic combinatorial means 340. As can be seen in FIG. 5, the resultant waveform R6 still depends on the number of true values present at the inputs of the combinatorial means and has the ability to produce pulses having a duration less than the minimum width of pulses in the first stage inputs. It should be recognized that output lines R5 and R6 should bypass the up and down level controls 410 and 430 and be directly coupled into output line 448.

Returning to the description of FIG. 1, the outputs of the combinatorial means form inputs to the pulse shaper means 400. The pulse shaper means 400 is used to determine additional characteristics of the pulses at the output of the pulse generator. The characteristics can include the risetime of the pulses and the amplitude of the pulses.

Figure 6:
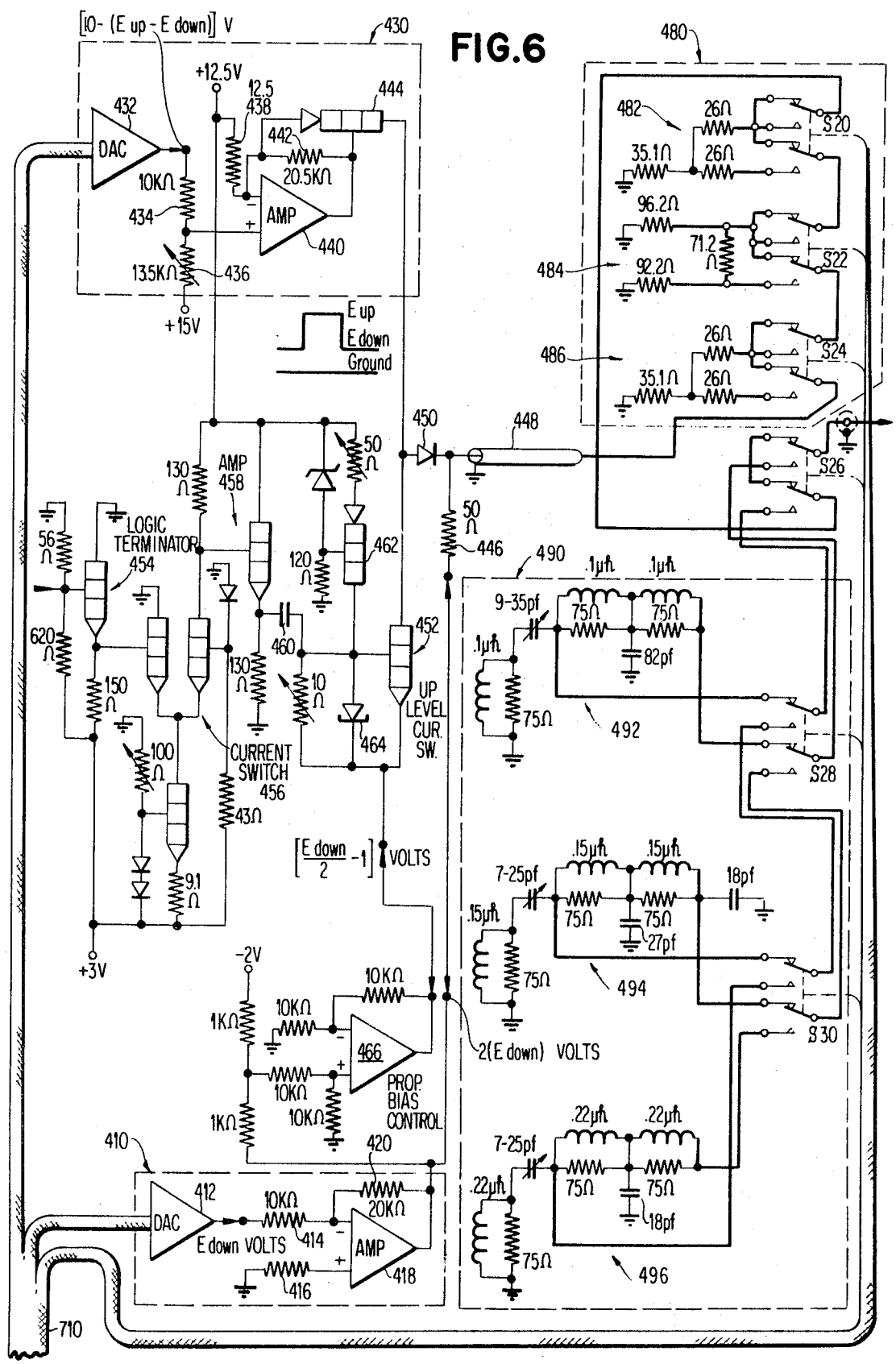
FIG. 6 is a circuit diagram of a preferred pulse shaper means for use in the preferred embodiment of the invention.

A preferred pulse shaper means for shaping a single resultant waveform produced by a boolean combinatorial means 300 is shown in FIG. 6. This pulse shaper means controls the up level of the output pulses and the down level of the output pulses, and, if so desired, controls the risetime of the output pulses and can attenuate the pulses. It is preferred to provide one of the pulse shaper means of FIG. 6 for each resultant waveform generated by combinatorial means 300.

The up and the down levels of the output pulses are controlled by computer 100 through a down level control shown generally at 410 and an up level control shown generally at 430. The down voltage level is set by providing a digital-to-analog converter 412 with the desired value of the down voltage. The digital-to-analog converter 412 converts the digital value to an analog voltage. The amplifier 418 doubles the voltage and presents it to a 50 ohm output line 448 through a 50 ohm resistor 446. The 50 ohm resistor 446 and the 50 ohm output line 448 together with a matched termination on the output line act as a voltage divider so that the voltage impressed on the output line is the voltage desired for the down level of the output pulse.

The up level of the output pulse is determined by up level control 430. For the voltage source values shown in FIG. 6 the digital-to-analog converter 432 is set to a value equal to [10-(Eup-Edown)] volts; where Eup is the desired value of voltage for the up level of the output waveform and Edown is the desired down-voltage level for the output waveform. The voltage produced by digital-to-analog converter 432 is converted by the circuitry of the up level control into a current which when applied to the output cable yields a voltage equal to Eup. Transistor 452 switches the current produced by the up level control between the output line and a current sink. When transistor 452 is turned on, the up level current is routed to the current sink, since the collector of transistor 452 is at a lower voltage than the output line and therefore diode 450 is back biased. When transistor 452 is turned off the collector is above the voltage on the output line and diode 450 is forward biased so that the up level current flows into the output line, setting the output voltage at Eup. The state of transistor 452 is determined by a combination of elements connected between the output of the combinatorial means 300 and transistor 452. Transistor 454 serves to terminate the logic signal from combinatorial means 300. The emitter of transistor 454 drives a current switch 456, which in turn drives an amplifier transistor 458. The emitter output of amplifier transistor 458 drives the base of current switch transistor 452 through capacitor 460 and will set tunnel diode memory 464. Thus the up level current is switched between the current sink and the output line in direct response to the logical output of combinatorial means 300. The amplifier 466 and its associated circuitry provides a proportional bias control to the emitter of transistor 452.

The output line 448 connects the output pulses to an attenuator section 480 and a risetime control section 490 of the pulse shaper means. Normally the pulse train bypasses both the attenuator and the risetime control and retains the levels impressed by the down and up level control circuits 410 and 430. However, where so desired there are three attenuator stages 482, 484, and 486 which may be inserted selectively or in combination into the path of the pulse train, so as to attenuate the pulse train. Attentuators 482, 484 and 486 each provides an attenuation ratio of $1/\sqrt{10}$. The attenuators provide a choice of three different attenuations, in addition to the no loss path provided when none of the attenuators is in the pulse path. The insertion of the attenuators into and the removal of the attenuators from the pulse path is controlled by computer controlled switches S20, S22, and S24. There are three risetime reducing circuits 492, 494 and 496 which may be included in the pulse path individually, or in combination if suitably wired, to provide 3 reduced risetimes for the output pulses, in addition to the no change in risetime provided by keeping the risetime circuits out of the pulse path. The insertion of the risetime circuits into and out of the pulse path is controlled by computer controlled switcher S28 and S30. The operation of both the attenuator circuits 480 and the risetime circuits 490 are well known in the art and will not be gone into here. It should be understood that the term risetime reducing circuit refers to a circuit that decreases the slope of a pulse transition.

The pulse shaper means 400 has as many outputs as inputs for resultant waveform generated by combinatorial means 300. The outputs of the pulse shaper means 400 preferably constitute the outputs of the pulse generator.

Feedback means 600 is connected to the outputs of the pulse shaper means 400 to provide information to the control computer 100 to enable control computer 100 to adjust the actual output characteristics to the desired characteristics. A number of feedback means may be used, however the preferred feedback means is shown and described in the related application cited at the beginning of this application, IBM Docket No. BU9-70-006 by E. J. Scray, Jr. And D. L. Wilder, entitled "A Time Coherent Sampling System of Eliminating the Effects of Test System Jitter and Providing a Simplified Single Transient Threshold Test;" which is being co-filed with this application. The related application, BU9-70-006, is hereby incorporated by reference into this application. The preferred feedback means samples the output waveforms to obtain information which is converted in digital form and transmitted to control computer 100 over cable 740 for storage and analysis. The control computer 100 provides the feedback means 600 with a trigger signal to indicate the beginning of a pulse cycle to enable the feedback means to obtain samples at the proper time.

Device under test 500 is connected to the outputs of the signal generator so that the signal generator's output can stimulate the device under test to produce data signals at its outputs. It is preferred to connect these data signals to the feedback means to enable the feedback means to obtain information about the data signals which it supplies the control computer 100 for analysis. The control computer can compare actual data signal characteristics with acceptable data characteristics stored in its memory 120, and thereby determine the quality of the device under test and classify and/or sort the device in accordance with its characteristics.

OPERATION OF THE PREFERRED EMBODIMENT

Referring to FIG. 1, the control computer 100 loads the registers 210 with binary patterns which will produce the output pulse sequences desired from those registers when the registers are read serially and sets the delay means 250 to values which should produce the desired delays in the pulse trains produced by the registers 210. The computer then sets the pulse shaper means 400 to provide the desired up level and down level voltages and the desired risetime and attenuations and sets feedback means 600 to obtain information about the actual characteristics of the output pulses. The clock 214 upon being activated produces a series of clock pulses which reads out registers 210 serially, delay means 250A...N delay the corresponding pulse trains by their predetermined amounts. Combinatorial means 300 combines the pulse trains from pulse source 200 into resultant pulse trains at the combinatorial means outputs. The resultant pulse trains applied to logic terminator transistor 454 control the operation of the up level current switch transistor 452 in each of the pulse shaper means within pulse shaper means 400. The output pulses at the output of the pulse shaper means are sampled by the feedback means 600 at predetermined times. The samples are converted to digital values which are presented to control computer 100. Comparator 110 then compares the actual output characteristics with the desired output characteristics stored in memory 120. If the desired and actual output characteristics agree within predefined limits, then the pulse generator is set up and is ready to proceed with testing device under test 500.

In the event that the actual and desired output characteristics do not agree, the control computer 100 adjusts the appropriate parts of the pulse generator to obtain a better match between the actual and desired output valves. With the preferred embodiment, there should be no need to change the contents of registers 210, or to adjust combinatorial means 300. If the level of the output pulses or their risetimes do not match the desired values, then pulse shaper means 400 is adjusted.

When an actual output pulse begins before it should, the delay means 250 is adjusted to increase the delay in the pulse train which determines the beginning of the output pulse in the way which is explained above in the detailed description of FIG. 3. When an output pulse begins after it should, delay means 250 is adjusted to decrease the delay in the pulse train which determines the beginning of the pulse. When a pulse stops before it should, the delay means 250 is adjusted to increase the delay in the waveform which determines the end of the pulse. When a pulse stops after it should, the delay means 250 is adjusted to decrease the delay in the waveform which determines the end of that pulse. A number of successive adjustments of the delay means 250 may be required to obtain pulses having the desired starting and stopping points. These is because of the tolerances in delay means D1–D10 of each delay 250A...250N. Although a number of adjustments may be necessary, the speed of the feedback means and the computer control results in a short time period for the adjustments and the entire pulse generator is set up in much less time than it would take a technician to make one adjustment. Once the pulse generator is set up, testing of device under test 500 can begin. During the testing the feedback means 600 obtains information about the characteristics of the data signals produced by device under test 500 in response to the stimulus from the pulse generator. This information is presented to and processed by control computer 100.

Device under test 500 can be stimulated with many different pulse patterns without the necessity of readjusting the pulse generator. Pulse patterns are changed by changing the binary numbers loaded into the register 210. No adjustment of the delays 250 and the pulse shaper 400 is necessary. Thus, the device under test 500 can be subjected to many different pulse stimuli in a very short period of time. Once device under test 500 has been completely tested, a new device under test may be substituted, thus allowing rapid complete testing of the devices to be tested.

ALTERNATE EMBODIMENT

An alternate embodiment of the pulse generator is shown in FIG. 2. The pulse generator of FIG. 2 is similar to that of FIG. 1, differing only in that the delays 250, shown in delays 252 in FIG. 2 have been placed between the clock 214 and the registers 210, shown as registers 212 in FIG. 2. This change means that the registers 212 no longer readout simultaneously because their readouts must be delayed in order to produce the same pulse trains at the input to combinatorial means 300 as the preferred embodiment of FIG. 1 produces.

The embodiment of FIG. 1 is preferred over the embodiment of FIG. 2 because the simultaneous readout of all the registers in the preferred embodiment allows the registers to be a binary memory adapted for simultaneous readout of all of its registers by a single clock signal. In contrast, the embodiment of FIG. 2 requires that each register have its own independent clock signal, although each clock signal is derived from a common clock.

OPERATION OF THE ALTERNATIVE EMBODIMENT

The set up and operation of the alternative embodiment is the same as that of the preferred embodiment, except that the clock pulse is delayed to delay the pulse trains, rather than the pulse trains being generated simultaneously and then being delayed.

Now returning to the discussion of the invention as a whole, the pulse generation system of the invention provides many different pulse patterns for a single set up of the generator; allows quick, automatic set up of the pulse generator; provides for pulses of much narrower width than a clock cycle; and provides for the signal generated performing all data acquisition tasks when used in a test system.

The system just described utilizing the feedback means 600 and the control computer 100 has the power to do result dependent testing on device under test 500. That is, it can sense and readjust iteratively to map a device-under-test's response over a wide variety of input values and combinations.

While the invention has been particularly shown and described with reference to the preferred embodiments thereof, it will be understood by those skilled in the art that various changes in form and details may be made without departing from the spirit and scope of the invention.

What is claimed is:
1. A controllable signal generator comprising:
   a pulse source providing a plurality of predetermined pulse trains, said pulse source having a plurality of outputs, one for each of said plurality of pulse trains;
   said pulse source including controllable delay means for controllably delaying selected ones of said plurality of pulse trains with respect to a reference time, said delay means being controllable by a control signal;
   control means for controlling the delay means, said control means including a control signal generator for generating control signals; and
   combinatorial means for combining the plurality of pulse trains to form one or more resultant waveforms, said combinatorial means having a plurality of inputs and as many outputs as there are resultant waveforms, each of said plurality of inputs of the combinatorial means being connected to one of the plurality of pulse source outputs so that each pulse source output is connected to the combinatorial means.

2. A signal generator as in claim 1 further comprising a controllable pulse shaper means for setting the characteristics of the resultant waveforms, said pulse shaper means having an input for each resultant waveform to be shaped, and an output terminal for each shaped waveform, each of said pulse-shaper-means inputs being connected to one of the outputs of the combinatorial means, said pulse shaper means being controllable by a control signal, and said output terminals of the pulse shaper being output terminals of the signal generator, whereby the signals at the pulse-shaper-means outputs are signal generator output signals.

3. A signal generator as in claim 2 wherein:
   said pulse source comprises at least one binary register, each of said ones of binary register being connected for serial readout of the bits stored in the register, each of said ones of registers having an output terminal, and said registers being connected for simultaneous readout; and wherein
   said controllable delay means is connected to at least one register output terminal for delaying the pulse train from each of said ones of connected register output terminals.

4. A signal generator as in claim 3 wherein the output of said combinatorial means is a boolean function of the inputs to the combinatorial means, each combinatorial means output having a true value whenever the combinatorial means inputs associated with that combinatorial means output satisfy the logical input conditions for a true output, and otherwise each combinatorial means output having a false value, whereby each resultant waveform is a series of constant amplitude pulses.

5. A signal generator as in Claim 4 further comprising:
   feedback means connected to the signal generator outputs for obtaining information about the characteristics of the output signals;
   said control means including a memory for storing desired characteristics of the output signals, and comparison means for comparing the desired characteristics of the output signal with the information about the characteristics of the actual signal obtained by the feedback means, said comparison means being supplied with the desired characteristics of the output signals for performing comparison between the desired and actual characteristics; and
   said comparison means including a correction information generator for generating correction information to enable the control means to modify the characteristics of the actual output signal to be the same as the desired characteristics of the output signal.

6. The signal generator as in claim 5 for use in a test system further comprising:
   a device under test connected to the output terminal of the signal generator for producing data signals in response to the output signals of the signal generator; and
   means connecting the feedback means to obtain information about the characteristics of the data signals so that the information about the data signals may be processed to determine the characteristics of the device under test.

7. A test system as in claim 6, wherein the feedback means is connected to simultaneously obtain information about the output signals of the signal generator and information about the data signals at the output of the device under test.

8. A test system as in claim 6, wherein the feedback means includes digital generation means for generating digital signals representative of the information obtained about the generator output signals and the data signals;
   and wherein said comparison means is a digital comparison means and said correction information generator is a digital correction information generator for generating correction information in digital form; and
   said control means is a digital computer.

* * * * *